US011753490B2

(12) United States Patent
Micoine et al.

(10) Patent No.: US 11,753,490 B2
(45) Date of Patent: Sep. 12, 2023

(54) METHOD FOR PRODUCING TEMPERATURE-STABLE POLYALKENYLENES

(71) Applicant: Evonik Operations GmbH, Essen (DE)

(72) Inventors: Kévin Micoine, Herten (DE); Velichka Koleva, Reken (DE); Dagmar Isabell Hackenberger, Herten (DE); Pedro Vazquez Toran, Valencia (ES)

(73) Assignee: Evonik Operations GmbH, Essen (DE)

( * ) Notice: Subject to any disclaimer, the term of this patent is extended or adjusted under 35 U.S.C. 154(b) by 458 days.

(21) Appl. No.: 15/733,679

(22) PCT Filed: Mar. 29, 2019

(86) PCT No.: PCT/EP2019/058082
§ 371 (c)(1),
(2) Date: Sep. 28, 2020

(87) PCT Pub. No.: WO2019/185911
PCT Pub. Date: Oct. 3, 2019

(65) Prior Publication Data
US 2021/0017310 A1    Jan. 21, 2021

(30) Foreign Application Priority Data
Mar. 29, 2018 (EP) .................... 18164862

(51) Int. Cl.
*C08F 132/04* (2006.01)
*C08F 6/08* (2006.01)
*C08G 61/06* (2006.01)

(52) U.S. Cl.
CPC ................. *C08F 132/04* (2013.01)

(58) Field of Classification Search
None
See application file for complete search history.

(56) References Cited

U.S. PATENT DOCUMENTS

| | | |
|---|---|---|
| 5,936,015 A | 8/1999 | Burns |
| 9,309,344 B2 | 4/2016 | Kadyrov et al. |
| 10,570,249 B2 | 2/2020 | Wursche et al. |
| 10,689,483 B2 | 6/2020 | Wursche et al. |
| 10,829,590 B2 | 11/2020 | Wursche et al. |
| 2005/0107626 A1 | 5/2005 | Herrmann et al. |
| 2013/0172635 A1 | 7/2013 | Hannen et al. |
| 2015/0299362 A1 | 10/2015 | Kadyrov et al. |
| 2018/0230263 A1 | 8/2018 | Wursche et al. |
| 2018/0273679 A1 | 9/2018 | Wursche et al. |
| 2019/0127516 A1 | 5/2019 | Wursche et al. |
| 2020/0002467 A1 | 1/2020 | Wursche et al. |
| 2020/0317856 A1 | 10/2020 | Micoine et al. |
| 2021/0017310 A1 | 1/2021 | Micoine et al. |

FOREIGN PATENT DOCUMENTS

| | | |
|---|---|---|
| CN | 101205242 | 6/2008 |
| DE | 44 21 454 | 12/1995 |
| EP | 1087838 | 5/2005 |
| EP | 2 933 274 | 10/2015 |
| EP | 3 034 538 | 6/2016 |
| EP | 3 153 227 | 4/2017 |
| WO | 2019/185911 | 10/2019 |

OTHER PUBLICATIONS

International Search Report dated Jun. 19, 2019 in PCT/EP2019/058082, with English translation, 6 pages.
Written Opinion dated Jun. 19, 2019 in PCT/EP2019/058082, with English translation, 10 pages.
Schwab et al., "*Synthesis and Applicatians of $RuCl_2(=CHR')(PR_3)_2$: The Influence of the Alkylidene Moiety on Metathesis Activity*", J. Am. Chem. Soc.; 1996, 118: 100-110.
Wang et al., U.S. Appl. No. 17/758,669, filed Jul. 12, 2022.
Extended European Search Report dated Sep. 14, 2018 in European Application No. 18164862.7, 11 pages.
Gianotti et al., "*Thermodynamic data for some even trans polyalkenamers*", European Polymer Journal, 1970, vol. 6, Issue 5, pp. 743-749.
U.S. Appl. No. 13/806,925, filed Mar. 14, 2013, 2013/0172635, Hannen et al.
U.S. Appl. No. 16/484,711, filed Aug. 8, 2019, 2020/0002467, Wursche et al.
U.S. Appl. No. 16/954,739, filed Jun. 17, 2020, 2020/0317856, Micoine et al.

*Primary Examiner* — Fred M Teskin
(74) *Attorney, Agent, or Firm* — Grüneberg and Myers PLLC

(57) ABSTRACT

The polymerization of cycloalkenamer is stopped by adding an alkyl vinyl derivative. Subsequently compound A is added, wherein compound A has at least one of the features i) or ii): i) at least one functional group or ii) at least one saturated or unsaturated aliphatic or aromatic heterocyclic ring having 3 to 14 ring atoms, wherein the ring atoms contain at least one carbon atom and at least one atom selected from oxygen, nitrogen and sulfur. A membrane filtration is subsequently carried out. This type of production produces polyalkenamers which are temperature-stable at 180° C.

13 Claims, No Drawings

METHOD FOR PRODUCING TEMPERATURE-STABLE POLYALKENYLENES

CROSS-REFERENCE TO RELATED APPLICATIONS

This application is a National Stage entry under § 371 of International Application No. PCT/EP2019/058082, filed on Mar. 29, 2019, which claims the benefit of European Application No. 18164862.7, filed on Mar. 29, 2018. The content of each of these applications is hereby incorporated by reference.

BACKGROUND OF THE INVENTION

Field of the Invention

The present invention relates to a process for producing polyalkenamer-containing compositions.

Description of Related Art

Polyalkenamers such as polyoctenamer (for example Vestenamer® from Evonik) are employed for example in tires, rubber articles, adhesives or packaging. The melting point is important in many applications since a polyalkenamer having a relatively high melting point has a relatively high crystallinity which results in better mechanical properties in most applications.

Polyoctenamers may be produced by ring-opening metathesis of cyclooctene. A catalyst must be added for this purpose. Suitable catalysts are for example tungsten complexes (U.S. Pat. Nos. 3,597,406, 4,095,033, DE2619197), molybdenum complexes (EP0218138; *Polymer* 1995, 36, 2787-2796) and ruthenium complexes (*J. Am. Chem. Soc.* 1993, 115, 9858-9859; *Macromolecules* 1993, 26, 4739-4741). Ruthenium carbenes in particular are very widely applicable and tolerate all common chemical groups (EP0626402, U.S. Pat. No. 8,324,334, US2016/159942). Very particularly suitable are ruthenium-carbene complexes which, as one of their characteristic features, bear an N-heterocyclic carbene ligand.

Ring-opening polymerization reactions may be stopped for example by addition of alkyl vinyl ethers such as ethyl vinyl ether or butyl vinyl ether or of alkyl vinyl sulfides such as ethyl vinyl sulfide (*Macromolecules* 2000, 33, 6239-6248). This forms a Fischer carbene which does not catalyze the ring opening metathesis. The ruthenium-carbene is also detached from the polymer chain by this chemical reaction.

The existing production processes with Mo or W catalysts can produce polyoctenamers having a melting point of no more than 54° C. to 56° C. In addition, such polymers typically contain high metal constituents and high chloride proportions. These are present at levels of more than 50 ppm of tungsten or molybdenum and more than 50 ppm of aluminium (for Al-based cocatalysts) and more than 50 ppm of chloride. The chloride and metal traces remain in the polymer material and cannot be separated easily. These metal traces must be kept as low as possible for many applications, for example in the foodstuffs industry or in medicine.

After synthesis on a production scale polyoctenamer is dried under vacuum at a temperature of 180° C. over several hours to fully remove the solvent of the reaction. Furthermore, depending on the application the polymer may be processed at high temperatures. During these high temperature treatments, side reactions which lower the melting point and the enthalpy of fusion of the polymer may take place. The melting points of polyoctenamer are often below 50° C. This changes the cistrans ratio of the double bonds in the polymer only slightly which does not by itself explain the change in melting point. This change is on the contrary explained by a regioisomerization of the double bonds along the polymer chain, as may be verified by the presence of additional signals in the 1H-NMR. A reduction in the melting point and in the melting enthalpy constitutes a change in the physicochemical properties of the polymer which is not acceptable in a great many applications.

WO 2017/060363 describes the purification of polyalkenamers by membrane filtration. The polymer is produced with a tungsten/aluminium catalyst system and has a melting point of 54° C. In addition, metal proportions of aluminium and tungsten of more than 50 ppm are present. Also described is the reaction with ruthenium carbenes as catalyst. However, the catalyst remains chemically connected to the polymer chain. In addition, the catalyst can degrade over time in inorganic ruthenium species, which block the membrane material.

In the industrial production process of the polyalkenamers several hours may elapse between the polymer synthesis and the polymer purification by membrane filtration, especially in case of a malfunction. The catalyst must therefore remain stably in solution for a long time in order to be readily removed from the polymer by the membrane.

EP 3034538 A1 describes biomaterials for medical applications containing antibiotics. In one example norbornene and functionalized norbornene are polymerized in the presence of a catalyst, wherein the catalyst is subsequently deactivated by addition of ethyl vinyl ether. This is followed by purification by ultrafiltration. EP 2933274 A1 (US 2015/299362 A1) discloses processes for producing polymers by ring-opening metathetic polymerization. This generates cost-effective Ru compounds and the amount of catalyst is reduced with improved catalyst activity. In J. Am, Chem, Soc, 1996, 118, 100 Schwab et al. describe the synthesis and application of Ru catalysts, wherein inter alia cyclooctene is employed and ethyl vinyl ether is added. This is followed by purification by means of columns and precipitation.

BRIEF SUMMARY OF THE INVENTION

The present invention has for its object to provide polyalkenamers which do not exhibit the disadvantages of the prior art. The polyalkenamers should have a higher melting point compared to known polyalkenamers. In addition, the polyalkenamers should contain the smallest possible metal proportions. The polyalkenamer should also retain its properties such as its melting point at processing temperatures of 180° C. and thus be thermally stable. A polyoctenamer should have a melting point of at least 57° C. In addition, the catalyst should remain stable and in solution for as long as possible, so that no inorganic, insoluble species are formed, which can block the membrane.

Surprisingly, a process for producing polyalkenamers which achieves the object has now been found. The inventive process for producing a polyalkenamer-containing composition comprises the following steps:

a) reacting at least one cycloalkene by ring-opening metathesic polymerization in at least one organic solvent to obtain a polyalkenamer-containing product mixture, wherein the polymerization is performed in the presence of at least one metal-containing catalyst and wherein the metal is selected from rhenium, ruthenium, osmium or mixtures thereof.

b) adding at least one alkyl vinyl derivative selected from C1- to C12-alkyl vinyl ether, C1- to C12-alkyl vinyl sulfide or mixtures thereof after the polymerization, wherein the amount of substance of the alkyl vinyl derivative is at least equal to the amount of substance of catalyst, c) adding at least one compound A after addition of the alkyl vinyl derivative, wherein the amount of substance of the compound A is at least equal to the amount of substance of catalyst, and wherein the compound A has at least one of the features i) or ii):
   i) at least one functional group selected from primary amino groups, secondary amino groups, tertiary amino groups, thiol groups, ester groups, carbonate ester groups, acetal groups, aldehyde groups, carbonyl groups, carboxamide groups, imido groups, oxime groups, thioester groups, nitrile groups, thiocyanate groups, primary ketimino groups, secondary ketimino groups, primary aldimino groups, secondary aldimino groups, sulfinyl groups, amino oxide groups, carboxyl groups, phosphine groups, phosphane oxide groups, phosphono groups or
   ii) at least one saturated or unsaturated aliphatic or aromatic heterocyclic ring having 3 to 14 ring atoms, wherein the ring atoms contain at least one carbon atom and at least one atom selected from oxygen, nitrogen and sulfur and d) working up the product mixture to remove the catalyst to obtain the polyalkenamer-containing composition, wherein the workup is carried out by membrane filtration in at least one organic solvent.

The at least one compound a is a ligand for the metal of the metal-containing catalyst.

DETAILED DESCRIPTION OF THE INVENTION

It was surprisingly found that the thermal stability of the polyalkenamers is markedly improved when Fischer carbenes (catalyst-alkyl vinyl ether-compound A adducts/catalyst-alkyl vinyl sulfide-compound A adducts) are formed by addition of an alkyl vinyl ether/alkyl vinyl sulfide and at least one compound A after the polymerization step and a subsequent membrane filtration is carried out. The addition of alkyl vinyl ether/alkyl vinyl sulfide makes it possible to terminate the polymerization and detach the catalyst from the polymer chain. The addition of the compound A markedly increases the stability of the Fischer carbene so that the catalyst can remain in solution for several hours after the synthesis without forming insoluble inorganic metal catalyst-containing compounds. In addition, these Fischer carbenes can be separated more efficiently than other metal-containing catalysts in the membrane filtration. This makes it possible to obtain polyalkenamers having low metal proportions. The melting points are higher than the melting points of polyalkenamers produced by processes of the prior art. Polyoctenamer obtained by the process according to the invention has a melting point of at least 57° C. after heat treatment (180° C. over 20 h, pressure 1 mbar).

The cycloalkene is selected from the group consisting of cyclobutene, cyclopentene, cycloheptene, cyclooctene, cyclononene, cyclodecene, cyclododecene, cycloocta-1,5-diene, 1,5-dimethylcycloocta-1,5-diene, cyclodecadiene, norbornadiene, cyclododeca-1,5,9-triene, trimethylcyclododeca-1,5,9-triene, norbornene (bicyclo[2.2.1]hept-2-ene), 5-(3'-cyclohexenyl)-2-norbornene, 5-ethyl-2-norbornene, 5-vinyl-2-norbornene, 5-ethylidene-2-norbornene, dicyclopentadiene and mixtures thereof. Preference is given to cyclopentene, cycloheptene, cyclooctene, cyclododecene and cycloocta-1,5-diene. Particular preference is given to cyclopentene, cycloheptene, cyclooctene and cyclododecene. Cyclooctene is an outstanding cycloalkene because of its availability and ease of handling. It is preferable when the cycloalkene comprises cycloctene and particularly preferable when it consists of this monomer. It is possible to use two or more cycloalkenes to form copolymers of the polyalkenamer. The cycloalkenes may be substituted with alkyl groups, aryl groups, alkoxy groups, carbonyl groups, alkoxycarbonyl groups and/or halogen atoms.

The polymerization reaction is performed in at least one organic solvent. Suitable solvents are in particular nonpolar aromatic or aliphatic solvents, aprotic nonpolar, aliphatic solvents being preferred. Suitable are for example saturated aliphatic hydrocarbons such as hexane, heptane, octane, nonane, decane, dodecane, cyclohexane, cycloheptane or cyclooctane; aromatic hydrocarbons such as benzene, toluene, xylene or mesitylene; halogenated hydrocarbons such as chloromethane, dichloromethane, chloroform or carbon tetrachloride; ethers such as diethyl ether, tetrahydrofuran or 1,4-dioxane; ketones such as acetone or methyl ethyl ketone; esters such as ethyl acetate; and mixtures of the aforementioned solvents. The solvent for the reaction is particularly preferably selected from the group consisting of alkanes having five to twelve carbon atoms, yet more preferably five to eight carbon atoms, and toluene. Also preferably selected are tetrahydrofuran, methyl ethyl ketone, chloromethane, dichloromethane, chloroform or mixtures thereof. Hexane or toluene are very particularly preferred, hexane being singled out in particular. The content of solvent may be set, for example, to a value of 20% to 60% by weight, preferably of 40% to 60% by weight, based on the total weight of cycloalkene and solvent.

When choosing the solvents for the ring-opening metathesis reaction it should be noted that the solvent should not deactivate the catalyst or the catalytically active species. Those skilled in the art can identify this by simple experiments or by studying the literature.

The polymerization is preferably performed at temperatures of 20° C. to 100° C. preferably 30° C. to 80° C. The pressure in the synthesis apparatus is typically 1 to 7 bar. During the polymerization the monomer concentration of cycloalkene is 0.1% to 60% by weight, preferably 20% to 50% by weight, in each case based on the total weight of cycloalkene and catalyst and any chain transfer agent and solvents present.

Metal-containing catalysts are employed to catalyze the polymerization. Suitable metals are rhenium, ruthenium, osmium or mixtures thereof, ruthenium-containing catalysts being preferred. Metal-carbene complexes bearing an N-heterocyclic carbene ligand are particularly suitable. Examples of suitable catalysts include

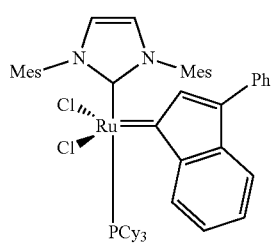

C1

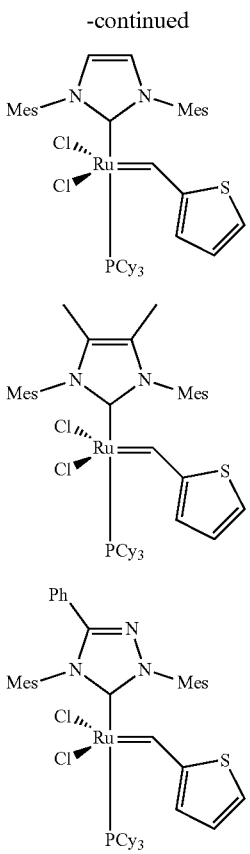

Tungsten-containing catalysts customary in the prior art are not suitable for the present process. The addition of alkyl vinyl ether does not bring about formation of Fischer carbenes and the metals of the catalyst cannot be effectively separated by membrane filtration. In addition, the melting point for example of polyoctenamer produced using tungsten catalyst is below 57° C.

To terminate the polymerization alkyl vinyl ether/alkyl vinyl sulfide is added. Suitable alkyl vinyl ethers are preferably selected from C1- to C6-alkyl vinyl ethers and mixtures thereof and preferably from methyl vinyl ether, ethyl vinyl ether, propyl vinyl ether, butyl vinyl ether and mixtures thereof. Preference is given to ethyl vinyl ether, butyl vinyl ether and mixtures thereof. Suitable alkyl vinyl sulfides are preferably selected from C1- to C6-alkyl vinyl sulfides and mixtures thereof and preferably from methyl vinyl sulfide, ethyl vinyl sulfide, propyl vinyl sulfide, butyl vinyl sulfide and mixtures thereof. Preference is given to ethyl vinyl sulfide, butyl vinyl sulfide and mixtures thereof.

The amount of substance of alkyl vinyl ether/alkyl vinyl sulfide is at least equal to the amount of substance of catalyst, preferably ruthenium catalyst, preferably at least ten times the amount of substance.

After the addition of alkyl vinyl ether/alkyl vinyl sulfide at least one compound A is added. The compound A preferably comprises 1 to 20 carbon atoms, wherein unsaturated compounds comprise at least two and cyclic compounds comprise at least three carbon atoms. The compound A may have the features i) or ii) or a combination of i) and ii). It is preferable when compound A comprises at least the feature ii). A compound A having the features i) may be saturated or unsaturated and may be aliphatic, including cycloaliphatic, or aromatic.

Preferred functional groups are primary amino groups, secondary amino groups, carboxamido groups, nitrile groups, primary ketimino groups, secondary ketimino groups, primary aldimino groups, secondary aldimino groups, carbonyl groups, amino oxide groups, sulfinyl groups, phosphine groups and phosphane oxide groups, wherein primary amino groups, secondary amino groups and nitrile groups are particularly preferred.

Suitable compounds A which comprise a functional group are i) amines or diamines having saturated or unsaturated aliphatic chains of 1 to 12 carbon atoms or having aromatic radicals of 5 to 14 carbon atoms; nitriles having a saturated or unsaturated aliphatic chain or having an aromatic radical of 1 to 8 carbon atoms; ketones or diketones having saturated or unsaturated aliphatic chains of 3 to 8 carbon atoms; sulfoxides having saturated or unsaturated aliphatic chains of 1 to 4 carbon atoms; phosphines, phosphane oxides or phosphonic acids or esters thereof having saturated or unsaturated aliphatic chains of 1 to 9 carbon atoms or having aromatic radicals of 5 to 14 carbon atoms; and amino acids.

A preferred compound having feature ii) comprises a saturated or unsaturated aliphatic heterocyclic ring having 3 to 14 ring atoms, very particularly preferably having 5 or 6 ring atoms. A preferred compound having feature ii) comprises an aromatic heterocyclic ring having 5 to 14 ring atoms, very particularly preferably having 5 or 6 ring atoms.

Particular preference is given to compounds A having an aromatic heterocyclic ring, wherein nitrogen-containing aromatic rings are very particularly preferred.

Suitable compounds A are for example triethylamine, tetramethylethylenediamine, 2-aminophenol, aniline, acetonitrile, propionitrile, benzonitrile, acetylacetone, dimethylsulfoxide, tricyclohexylphosphine, triethylphosphite, triphenylphosphine, cysteine, N-methylimidazoline, imidazoline, N-methylimidazole, imidazole, pyridine, pyrazine, furan, thiophene, oxazole, thioxazole, 2-mercaptopyridine, 2-mercaptopyridine-3-carboxylic acid. Particularly preferred compounds A are acetonitrile, 2-aminophenol, pyridine, N-methylimidazole or mixtures thereof.

The amount of substance of compound A is at least equal to the amount of substance of catalyst, preferably ruthenium catalyst, preferably at least ten times the amount of substance.

After addition of alkyl vinyl ether/alkyl vinyl sulfide and compound A the catalyst in the form of an adduct is separated from the polyalkenamer-containing product mixture by membrane filtration. After the membrane filtration has been performed the worked-up product mixture preferably contains less than 50 ppm of rhenium, less than 50 ppm of ruthenium and less than 50 ppm of osmium. Less than 20 ppm of rhenium, less than 20 ppm of ruthenium and less than 20 ppm of osmium are particularly preferred. It is very particularly preferable when the content of the sum of the three metals is less than 10 ppm, more preferably less than 5 ppm and in particular less than 2 ppm. This relates in each case to the worked-up polyalkenamer-containing composition after heat treatment at 180° C. and 1 mbar for 20 h.

The product mixture comprises polyalkenamer and catalyst-alkyl vinyl ether-compound A adduct/catalyst-alkyl vinyl sulfide-compound A adduct. Unreacted monomer and possibly oligomers may also be present. Oligomers are copolymers having molecular mass below 3000 g/mol. The product mixture is supplied to a filtration membrane for workup. This type of membrane filtration may be an ultrafiltration or a nanofiltration for example, preferably an ultrafiltration. In this step the smaller molecules (monomers, oligomers and catalyst-alkyl vinyl ether-compound A adduct/catalyst-alkyl vinyl sulfide-compound A adduct) are separated from the polymer by permeating through the membrane. Fresh solvent is added to "wash" the small components through the membrane. In this way the monomers, oligomers and catalyst-alkyl vinyl ether adduct/catalyst-alkyl vinyl sulfide adduct pass into the permeate and the polyalkenamer remains in the retentate.

The membrane filtration may employ a solvent that is also suitable for the polymerization. The solvent of the membrane filtration may be the same as or different from the solvent used to perform the polymerization. It is preferable when the same solvent is used for the polymerization and the membrane filtration. Steps a), b) and c) are thus each performed in an organic solvent and so the polyalkenamer-containing product mixture is in each case in a solution.

The membrane filtration typically employs 0 to 10 washing volumes (1 washing volume=1 feed volume), preferably 1 to 5 washing volumes. The thus obtained polymer solution may be subjected to further processing (for example drying, compounding etc.).

The membrane separation may be effected either by ultrafiltration or else by a nanofiltration. Suitable conditions for the ultrafiltration are: proportion of polymer of 0.1% to 70% by weight based on the product mixture, temperature of 20° C. to 100° C., preferably 30° C. to 80° C. and pressure of 0 to 6 bar. Suitable conditions for the nanofiltration are: proportion of polymer of 0.1% to 70% by weight based on the product mixture, temperature of 20° C. to 100° C., preferably 30° C. to 80° C. and pressure of 10 to 60 bar.

The permeate from the membrane filtration may be supplied to a nanofiltration membrane to recover the catalyst-alkyl vinyl ether adduct/catalyst-alkyl vinyl sulfide adduct and the separated oligomers. The retentate from the nanofiltration comprising the adduct may be recycled to the polymerization reaction. The catalyst may first require reactivation. The recycling significantly reduces the consumption of fresh catalyst in the polymerization step. The permeate from this nanofiltration which is predominantly free from oligomers and adduct may be recycled into the ultrafiltration as washing solvent. This allows the consumption of fresh solvent to be significantly reduced. Alternatively, the solvent may be distilled and reused.

Typical molecular separation limits of the ultrafiltration membrane at which 90% of the molecules of a particular molar mass are retained are between 1000 to 100 000 g/mol (T. Melin, R. Rautenbach, Membranverfahren: Grundlagen der Modul-und Anlagenauslegung, 3rd ed., Springer 2007, p. 313). The separation limit of nanofiltration membranes is between 100 and 2000 g/mol (T. Melin, R. Rautenbach, Membranverfahren: Grundlagen der Modul-und Anlagenauslegung, 3rd ed., Springer 2007, p. 286, diagram). Accordingly, a suitable membrane may be a nano- or ultrafiltration membrane. Membranes having separation limits in the range from 1000 to 50 000 g/mol are preferably used. A suitable membrane having the desired separation capacity is stable in the solvent or solvent mixture used.

The membrane of the membrane filtration preferably comprises a separation layer made of polymer, glass, metal, ceramic or mixtures thereof.

Suitable inorganic membranes are selected from porous metallic materials, ceramic membranes and polymer ceramic membranes, each of which may be selected from aluminium oxide, titanium dioxide, zirconium dioxide, silicon dioxide, titanium nitrite, silicon carbide or mixtures and modifications thereof. Ceramic membranes of this kind are supplied, for example, by Inopor GmbH, PALL Corporation or TAMI Industries. An overview of suppliers may be found in R. Mallada, M, Inorganic Membranes: Synthesis, Characterization and Applications, Elsevier, 2008, p. 182, table 6.1. Because of the relatively high ratio of active membrane area to system volume, membranes in the form of spiral-wound modules of polymer membranes are particularly preferred.

Preference is given to solvent-stable polymer membranes, as described, for example, in US 2012/0123079, WO 2010/142979, US 2012/0279922 or EP 0943645B1.

Suitable membrane separation layers are described, for example, in WO 2010/142979, US 2012/0279922 or EP 0943645B1, Suitable polymers are suitable for organic solvents in particular. The membrane separation layers are preferably selected from polydimethysiloxanes (PDMS) or modifications thereof (especially acrylate modifications), polyacrylonitriles (PAN), polyimides (PI), polyetheretherketones (PEEK), polyvinylidene fluorides (PVDF), polyamides (PA), polyamidimides (PAD), polyethersulfones (PES), polybenzimidazoles (PBI), sulphonated polyetheretherketones (SPEEK), polyethylenes (PE) and polypropylenes (PP). Less preferred are membranes optimized for aqueous systems. These usually include polymers such as cellulose acetate (CA), polyethersulphones (PES) and polysulphones (PS).

Suitable membranes made of crosslinked silicone acrylates are described for example in US 2015/0328619.

In a particular embodiment of the invention the separation-active layer of the membrane is selected from crosslinked silicone acrylates, polydimethylsiloxane (PDMS) and polyimide.

Establishment of parameters such as selection of the material of the membrane separation layer, temperature, pressure and membrane surface area can be undertaken by the those skilled in the art by suitable preliminary experiments. Forecasting models for the performance of employed membranes are not yet available.

After the membrane separation, the solvent in which the polyalkenamer-containing composition is dissolved may be removed. This can be undertaken by heating or pressure reduction, for example by means of vacuum degassing. Alternatively or in addition, a drying operation may be performed, for example under reduced pressure and/or at elevated temperature, to remove the solvent. The solid obtained can be pelletized to afford particles, for example by strand pelletization or underwater pelletization, or pulverized, for example by spray-drying or grinding.

The process according to the invention may be performed continuously or batchwise.

It is preferable when the polyoctenamer has a weight-average molecular weight (Mw) of 3000 g/mol to 500 000 g/mol, preferably of 2000 g/mol to 400 000 g/mol and particularly preferably of 5000 to 350 000 g/mol. The method of measurement is specified in the examples.

The desired molar weight may for example be established in the presence of at least one chain transfer agent which allows chain growth to be terminated. Suitable chain transfer agents are known from the literature and include for example acyclic alkenes having one or more nonconjugated double bonds which may be terminal or internal and which preferably do not bear any substituents. Such compounds are, for example, pent-1-ene, hex-1-ene, hept-1-ene, oct-1-ene or pent-2-ene. Alkyl vinyl ethers do not fall within this definition as they are not usable as chain transfer agents. The reason for this is that alkyl vinyl ethers deactivate the catalyst. Alternatively employable as chain transfer agents are cyclic compounds comprising a double bond in their side chain, for example vinylcyclohexene.

The cis/trans ratio of the cycloalkenamers can be adjusted by methods familiar to those skilled in the art. The ratio depends for example on catalysts, solvents, stirring intensity or temperature or reaction time. It is preferable when the trans content is at least 55%, preferably at least 70% and particularly preferably 75% to 85%. The cis/trans ratio is determined by $^1$H NMR in deuterochloroform.

The invention likewise describes for the use of at least one polyalkenamer-containing composition produced according to the invention in tires, rubber articles, adhesives or packaging materials, wherein the packaging materials are preferably used for foodstuffs.

The invention further provides polyoctenamer having a melting point of at least 57° C., preferably 57° C. to 60° C., preferably 58° C. to 60° C., particularly preferably 59° C. to 60° C., after heat treatment at a temperature of 180° C. and a pressure of 1 mbar for 20 h. The polyoctenamer according to the invention is preferably produced by the process according to the invention.

EXAMPLES

Methods of Determination
Weight-Average Molecular Weight
Determination of molecular weight was carried out by gel permeation chromatography (GPC) as per DIN 55672-1: 2016-03. Measurements were performed with a GPC system from Knauer Wissenschaftliche Geräte GmbH. The polymer was measured as a solution in tetrahydrofuran (c=5 g/L, injection volume 100 μL) on an SDV column (30 cm, 5 μm, linear) with pre-column (SDV 5 cm, 5 μm, 100 Å) at 23° C. and a flow rate of 1 mL/min. Calculation of the average molar masses was carried out by means of the strip method against polystyrene standards. WinGPC UniOhrom (Build 5350) software from PSS Polymer Standards Service GmbH was employed for evaluation.

Melting Point and Melting Enthalpy
Determination of melting point and melting enthalpy was carried out by differential scanning calorimetry (DSC). Polymer samples between 5 and 10 mg were measured. Measurements were performed on a PerkinElmer DSC-7 instrument with 20 mL/min of nitrogen 5.0 as purging gas. The measurement program contained a first heating from −90° C. to 80° C. (heating rate 20 K/min), a cooling from 80° C. to −90° C. (cooling rate 20 K/min) and a second heating from −90° C. to 80° C. (heating rate 20 K/min). The melting point and the melting enthalpy of the polyalkenamers was determined using the second heating.

Trace Elemental Analysis
Determination of trace elements from the catalyst in the polyalkenamer were performed quantitatively by ICP-MS. 0.1-0.2 g of sample were digested in 10 ml of 65% by weight $HNO_3$ and 2 mL of water at not more than 130 bar of pressure and not more than 300° C. The digestate was evaporated in a closed system at not more than about 95° C., dissolved with 0.5 mL of $HNO_3$ and made up to 20 mL with water. The content of various elements in the solution was determined quantitatively with a Thermo Fisher "ICAP Q" quadrupole ICPMS.

Example 1A: Synthesis of Polyoctenamer in Heptane with Tungsten/Aluminium Catalyst System 585 mL of heptane, 100 g of cyclooctene (COE) and 0.34 g of vinyl cyclohexene (VCH) were charged into a dry 2 L glass reactor fitted with a mechanical stirrer under argon. The reaction mixture was heated to 50° C. and 0.4 mL of a solution of ethylaluminium dichloride (20% by weight) in heptane was added. Subsequently, 1 mL of a solution of tungsten hexachloride/propylene oxide (1/3 mol/mol) in toluene (2.8% by weight of tungsten) were added slowly.

A temperature increase of 5° C. was observed and the reaction mixture became markedly more viscous. The contents of the reactor were then discharged and a solution of 20% by weight of polyoctenamer in heptane was obtained.

Example 1B (Comparative Example): Membrane Purification of Polyoctenamer in Heptane with Tungsten/Aluminium Catalyst System 1.25 L of the solution of 20% by weight of polyoctenamer in heptane (produced as per example 1A) was further diluted to 5% by weight with 3.75 L of heptane. The obtained 5 L of polymer solution was recirculated for 3 hours at 50° C. and then purified by diafiltration through a PuraMem® UF (cut-off about 35 000 Da) ultrafiltration polymer membrane from Evonik Resource Efficiency GmbH. This was carried out using a crossflow filtration system with an 1812 membrane module (membrane area about 0.14 m$^2$). In a diafiltration the membrane is used as a semipermeable barrier, the large molecules (polymer) being retained and the small molecules (impurities) being washed out through the membrane by solvent addition. The addition of fresh solvent was synchronized with the permeate flow so that the fill level in the feed container remained constant. The experiment was performed at 50° C. and 3 bar and altogether 25 L of fresh heptane were added (5 washing volumes in relation to the starting volume of the polymer solution). 5 L of polymer solution were obtained as retentate after this purification. 25 L of permeate solution were also obtained.

Heat Treatment at 180° C.
For analytical purposes 10 mL of the retentate (purified polymer solution) were dried in an aluminium dish in a vacuum drying cabinet over 20 h at 180° C. and a vacuum of 1 mbar after inertization with nitrogen. 1.5 g of white solid were obtained. The NMR spectrum of the solid corresponded to the expected structure of a polyoctenamer which contained 0.25 mol % of vinyl end groups and 0.30 mol % of cyclohexane end groups.

$^1$H NMR (CDCl$_3$, 500 MHz, 30° C.) δ (ppm): polyoctenamer: 5.38, 5.34, 2.01, 1.96, 1.30; end groups: 5.81 (m, 1H, —CH2=C$\underline{H}$—CH2-), 5.66 (d, 2H, CH2-C$\underline{H}$=C$\underline{H}$—CH2), 5.38-5.34 (m, 2H, —CH—C$\underline{H}$=C$\underline{H}$—CH2), 4.95 (m, 2H, C$\underline{H}$2=CH—CH2-). Cis/trans double bond ratio: 22/78

Melting point: 54° C.
Melting enthalpy: 75 J/g
Molar mass M$_w$: 135 000 g/mol
Oligomer proportion (M<3000 g/mol): 3.8%
A trace elemental analysis showed that the polymer contained 250 ppm of tungsten, 125 ppm of aluminium and 110 ppm of chlorine.

Example 2A: Synthesis of Polyoctenamer in Heptane with Ru Catalyst

1 L of heptane, 300 g of cyclooctene (COE) and 1.03 g of vinyl cyclohexene (VCH) were charged into a dry 2 L glass reactor fitted with a mechanical stirrer under argon. The reaction mixture was heated to 70° C. and a solution of 14.4 mg of tricyclohexylphosphine[1,3-bis(2,4,6-trimethylphenyl)-4,5-dimethylimidazol-2-ylidene](2-thienylmethyliden) ruthenium(II) dichloride (catalyst C3) in 3.27 mL of toluene was added. A temperature increase of 16° C. was observed and the reaction mixture became markedly more viscous.

The contents of the reactor were then discharged and a solution of 30% by weight of polyoctenamer in heptane was obtained.

Example 2B (Comparative Example): Membrane Purification of Polyoctenamer in Heptane with Ru Catalyst 0.8 L of the solution of 30% by weight of polyoctenamer in heptane (produced as per example 2A) was further diluted to 5% by weight with 4.2 L of heptane. The obtained 5 L of polymer solution was recirculated for 3 hours at 50° C. and then purified by diafiltration through a PuraMem® UF (cut-off about 35 000 Da) ultrafiltration polymer membrane from Evonik Resource Efficiency GmbH. This was carried out using a crossflow filtration system with an 1812 membrane module (membrane area about 0.14 m$^2$). The addition of fresh solvent was synchronized with the permeate flow so that the fill level in the feed container remained constant. The experiment was performed at 50° C. and 3 bar and altogether 25 L of fresh heptane were added (5 washing volumes in relation to the starting volume of the polymer solution), 5 L of polymer solution were obtained as retentate after this purification. 25 L of permeate solution were also obtained.

Heat Treatment at 80° C.

For analytical purposes 10 mL of this solution were dried in an aluminium dish in a vacuum drying cabinet over 3 h at 80° C. and a vacuum of 1 mbar after inertization with nitrogen. 2 g of white solid were obtained. The NMR spectrum of the solid corresponded to the expected structure of a polyoctenamer which contained 0.30 mol % of vinyl end groups and 0.32 mol % of cyclohexene end groups. Cis/trans double bond ratio: 22/78

$^1$H NMR (CDCl$_3$, 500 MHz, 30° C.) δ (ppm): polyoctenamer: 5.38, 5.34, 2.01, 1.96, 1.30; end groups: 5.81 (m, 1H, —CH2=CH—CH2-), 5.66 (d, 2H, CH2-CH=CH—CH2), 5.38-5.34 (m, 2H, —CH—CH=CH—CH2), 4.95 (m, 2H, CH2=CH—CH2-).

Melting point: 57° C.

Melting enthalpy: 78 J/g

Molar mass M$_w$: 115 000 g/mol

Oligomer proportion (M<3000 g/mol): 7%

Heat Treatment at 180° C.

For analytical purposes 10 mL of this solution were dried in an aluminium dish in a vacuum drying cabinet over 20 h at 180° C. and a vacuum of 1 mbar after inertization with nitrogen. 2 g of white solid were obtained. The NMR spectrum of the solid partly corresponded to the expected structure of a polyoctenamer (see above) but the end groups (vinyl and cyclohexene end groups) were absent and unknown signals were observed in the olefin region. Cis/trans double bond ratio: 20/80

Melting point: 30° C.

Melting enthalpy: 58 J/g

The markedly lower melting point and melting enthalpy values compared to drying at 80° C. showed that the polymer was unstable at a temperature of 180° C. The polymer solution contained fine grey particles that blocked the membrane so that further use thereof was not possible. The grey particles were presumably inorganic ruthenium-containing compounds which were insoluble and remained in the polymer after drying.

Example 2C (Comparative Example): Membrane Purification of Polyoctenamer in Heptane with Ru Catalyst and Addition of Butyl Vinyl Ether (No Addition of Compound A)

1 L of heptane, 300 g of cyclooctene (COE) and 1.03 g of vinyl cyclohexene (VCH) were charged into a dry 2 L glass reactor fitted with a mechanical stirrer under argon. The reaction mixture was heated to 50° C. and a solution of 24 mg of tricyclohexylphosphine[1,3-bis(2,4,6-trimethylphenyl)-4,5-dimethylimidazol-2-ylidene](2-thienylmethyliden) ruthenium(II) dichloride (catalyst C3) in 5.4 mL of toluene was added. A temperature increase of 19° C. was observed and the reaction mixture became markedly more viscous. 2.7 g of butyl vinyl ether were added 15 min after catalyst addition. After 30 min at 50° C. the contents of the reactor were discharged and a solution of 30% by weight of polyoctenamer in heptane was obtained.

0.8 L of the solution of 30% by weight of polyoctenamer in heptane were further diluted to 5% by weight with 4.2 L of heptane. The obtained 5 L of polymer solution were recirculated for 3 hours at 50° C. and then purified by diafiltration through a PuraMem® UF (cut-off about 35 000 Da) ultrafiltration polymer membrane from Evonik Resource Efficiency GmbH. This was carried out using a crossflow filtration system with a 1812 membrane module (membrane area about 0.14 m$^2$). The addition of fresh solvent was synchronized with the permeate flow so that the fill level in the feed container remained constant. The experiment was performed at 50° C. and 3 bar and altogether 25 L of fresh heptane were added (5 washing volumes in relation to the starting volume of the polymer solution). 5 L of polymer solution were obtained as retentate after this purification. 25 L of permeate solution were also obtained.

Heat Treatment at 80° C.

For analytical purposes 10 mL of this solution were dried in an aluminium dish in a vacuum drying cabinet over 3 h at 80° C. and a vacuum of 1 mbar after ineilization with nitrogen. 2 g of white solid were obtained. The NMR spectrum of the solid corresponded to the expected structure of a polyoctenamer which contained 0.30 mol % of vinyl end groups and 0.32 mol % of cyclohexene end groups. Cis/trans double bond ratio: 21/79

$^1$H NMR (CDCl$_3$, 500 MHz, 30° C.) δ (ppm): Polyoctenamer: 5.38, 5.34, 2.01, 1.96, 1.30; End groups: 5.81 (m, 1H, —CH2=CH—CH2-), 5.66 (d, 2H, CH2-CH=CH—CH2), 5.38-5.34 (m, 2H, —CH—CH=CH—CH2), 4.95 (m, 2H, CH2=CH—CH2-).

Melting point: 57° C.

Melting enthalpy: 83 J/g

Molar mass M$_w$: 100 000 g/mol

Oligomer proportion (M<3000 g/mol): 10%

Heat Treatment at 180° C.

For analytical purposes 10 mL of this solution were dried in an aluminium dish in a vacuum drying cabinet over 20 h at 180° C. and a vacuum of 1 mbar after inertization with nitrogen. 2 g of white solid were obtained. The NMR spectrum of the solid partly corresponded to the expected structure of a polyoctenamer (see above) but the end groups (vinyl and cyclohexene end groups) were absent and unknown signals were observed in the olefin region. Cis/trans double bond ratio: 22/78

Melting point: 49° C.

Melting enthalpy: 71 J/g

The lower melting point and melting enthalpy compared to drying at 80° C. showed that the polymer was unstable at a temperature of 180° C. A trace elemental analysis showed that the polymer contained 3.5 ppm of ruthenium.

The ruthenium-containing catalyst was only partially removed. The addition of butyl vinyl ether was apparently not sufficient to stabilize the catalyst during the 3 hours prior to the membrane filtration: presumably insoluble inorganic ruthenium-containing compounds were formed and remained in the polymer after drying.

Example 3A (Comparative Example): Synthesis of Polyoctenamer in Heptane with Ru Catalyst and Addition of Butyl Vinyl Ether then 2-aminophenol 1 L of heptane, 300 g of cyclooctene (COE) and 1.03 g of vinyl cyclohexene (VCH) were charged into a dry 2 L glass reactor fitted with a mechanical stirrer under argon. The reaction mixture was heated to 50° C. and a solution of 24 mg of tricyclohexylphosphine[1,3-bis(2,4,6-trimethylphenyl)-4,5-dimethylimidazol-2-ylidene](2-thienylmethyliden)ruthenium(II) dichloride (catalyst C3) in 5.4 mL of toluene was added. A temperature increase of 19° C. was observed and the reaction mixture became markedly more viscous. 2.7 g of butyl vinyl ether were added 15 min after catalyst addition. The reaction mixture was stirred for a further 15 min and 0.3 g of 2-aminophenol (dissolved in 10 ml of ethanol) was added. After 30 min at 50° C. the contents of the reactor were discharged and a solution of 30% by weight of polyoctenamer in heptane was obtained.

Heat Treatment at 80° C.

For analytical purposes 10 mL of this solution were dried in an aluminium dish in a vacuum drying cabinet over 3 h at 80° C. and a vacuum of 1 mbar after inertization with nitrogen, 2 g of white solid were obtained. The NMR spectrum of the solid corresponded to the expected structure of a polyoctenamer which contained 0.30 mol % of vinyl end groups and 0.28 mol % of cyclohexene end groups. Cis/trans ratio double bond ratio: 21/79

$^1$H NMR (CDCl$_3$, 500 MHz, 30° C.) δ (ppm): Polyoctenamer: 5.38, 5.34, 2.01, 1.96, 1.30; end groups: 5.81 (m, 1H, —CH2=C$\underline{H}$—CH2-), 5.66 (d, 2H, CH2-C$\underline{H}$=C$\underline{H}$—CH2), 5.38-5.34 (m, 2H, —CH—C$\underline{H}$=C$\underline{H}$—CH2), 4.95 (m, 2H, C$\underline{H}$2=CH—CH2-).

Melting point: 60° C.
Melting enthalpy: 82 J/g
Molar mass $M_w$: 104 000 g/mol
Oligomer proportion (M<3000 g/mol): 2.5%

Heat Treatment at 180° C.

For analytical purposes 10 mL of this solution were dried in an aluminium dish in a vacuum drying cabinet over 20 h at 180° C. and a vacuum of 1 mbar after inertization with nitrogen, 2 g of white solid were obtained. The NMR spectrum of the solid partly corresponded to the expected structure of a polyoctenamer (see above) but the end groups (vinyl and cyclohexene end groups) were absent and unknown signals were observed in the olefin region. Cis/trans double bond ratio: 25/75

Melting point: 29° C.
Melting enthalpy: 65 J/g

The markedly lower melting point and melting enthalpy compared to drying at 80° C. showed that the polymer was unstable at a temperature of 180° C. A trace elemental analysis showed that the polymer contained 8.6 ppm of ruthenium.

Example 3B (Inventive): Membrane Purification of Polyoctenamer in Heptane with Ru Catalyst and Addition of Butyl Vinyl Ether then 2-aminophenol 0.8 L of the solution of 30% by weight of polyoctenamer in heptane (produced as per example 3A) was further diluted to 5% by weight with 4.2 L of heptane. The obtained 5 L of polymer solution was recirculated for 3 hours at 50° C. and then purified by diafiltration through a PuraMem® UF (cut-off about 35 000 Da) ultrafiltration polymer membrane from Evonik Resource Efficiency GmbH. This was carried out using a crossflow filtration system with an 1812 membrane module (membrane area about 0.14 m$^2$). The addition of fresh solvent was synchronized with the permeate flow so that the fill level in the feed container remained constant. The experiment was performed at 50° C. and 3 bar and altogether 25 L of fresh heptane were added (5 washing volumes in relation to the starting volume of the polymer solution). 5 L of polymer solution were obtained as retentate after this purification. 25 L of permeate solution were also obtained.

Heat Treatment at 180° C.

For analytical purposes 10 mL of the retentate (purified polymer solution) were dried in an aluminium dish in a vacuum drying cabinet over 20 h at 180° C. and a vacuum of 1 mbar after inertization with nitrogen, 2 g of white solid were obtained. The NMR spectrum of the solid corresponded to the expected structure of a polyoctenamer which contained 0.29 mol % of vinyl end groups and 0.26 mol % of cyclohexene end groups. Cis/trans double bond ratio: 21/79

$^1$H NMR (CDCl$_3$, 500 MHz, 30° C.) δ (ppm): Polyoctenamer: 5.38, 5.34, 2.01, 1.96, 1.30; end groups: 5.81 (m, 1H, —CH2=C$\underline{H}$—CH2-), 5.66 (d, 2H, CH2-C$\underline{H}$=C$\underline{H}$—CH2), 5.38-5.34 (m, 2H, —CH—C$\underline{H}$=C$\underline{H}$—CH2), 4.95 (m, 2H, C$\underline{H}$2=CH—CH2-).

Melting point: 59° C.
Melting enthalpy: 81 J/g
Molar mass $M_w$: 111 000 g/mol
Oligomer proportion (M<3000 g/mol): 0.8%

The high melting point (>56° C.) and the high melting enthalpy (>75 J/g) showed that the purified polyoctenamer was stable under the temperature conditions at 180° C.

The reduction in the oligomer proportion in the GPC compared to the starting solution (see example 3A) showed that this purification by ultrafiltration allowed separation of oligomers. A trace elemental analysis showed that the polymer contained only 0.2 ppm of ruthenium. In addition, no insoluble particles in the polymer solution were observed.

Example 4A (Comparative Example): Synthesis of Polyoctenamer in Heptane with Ru Catalyst and Addition of Butyl Vinyl Ether then N-methylimidazole 1 L of heptane, 300 g of cyclooctene (COE) and 1.03 g of vinyl cyclohexene (VCH) were charged into a dry 2 L glass reactor fitted with a mechanical stirrer under argon. The reaction mixture was heated to 50° C. and a solution of 24 mg of tricyclohexylphosphine[1,3-bis(2,4,6-trimethylphenyl)-4,5-dimethylimidazol-2-ylidene](2-thienylmethyliden)ruthenium(II) dichloride (catalyst C3) in 5.4 mL of toluene was added. A temperature increase of 15° C. was observed and the reaction mixture became markedly more viscous. 2.7 g of butyl vinyl ether were added 15 min after catalyst addition. The reaction mixture was stirred for a further 15 min and 0.22 g of N-methylimidazole was added. After 30 min at 50° C. the contents of the reactor were discharged and a solution of 30% by weight of polyoctenamer in heptane was obtained.

Heat Treatment at 80° C.

For analytical purposes 10 mL of this solution were dried in an aluminium dish in a vacuum drying cabinet over 3 h at 80° C. and a vacuum of 1 mbar after inertization with nitrogen. 2 g of white solid were obtained. The NMR spectrum of the solid corresponded to the expected structure of a polyoctenamer which contained 0.31 mol % of vinyl end groups and 0.28 mol % of cyclohexene end groups. Cis/trans double bond ratio: 21/79

$^1$H NMR (CDCl$_3$, 500 MHz, 30° C.) δ (ppm); Polyoctenamer: 5.38, 5.34, 2.01, 1.96, 1.30; end groups; 5.81 (m, 1H, —CH2=C$\underline{H}$—CH2-), 5.66 (d, 2H, CH2-C$\underline{H}$=C$\underline{H}$—CH2), 5.38-5.34 (m, 2H, —CH—C$\underline{H}$=C$\underline{H}$—CH2), 4.95 (m, 2H, C$\underline{H}$2=CH—CH2-).

Melting point: 57° C.
Melting enthalpy: 78 J/g
Molar mass $M_w$: 99 900 g/mol
Oligomer proportion (M<3000 g/mol): 2%
Heat Treatment at 180° C.

For analytical purposes 10 mL of this solution were dried in an aluminium dish in a vacuum drying cabinet over 20 h at 180° C. and a vacuum of 1 mbar after inertization with nitrogen. 2 g of white solid were obtained. The NMR spectrum of the solid partly corresponded to the expected structure of a polyoctenamer (see above) but the end groups (vinyl and cyclohexene end groups) were absent and unknown signals were observed in the olefin region, Cis/trans double bond ratio: 24/76

Melting point: 49° C.
Melting enthalpy: 70 J/g

The markedly lower melting point and melting enthalpy compared to drying at 80° C. showed that the polymer was unstable at a temperature of 180° C. A trace elemental analysis showed that the polymer contained 8.4 ppm of ruthenium.

Example 4B (Inventive): Membrane Purification of Polyoctenamer in Heptane with Ru Catalyst and Addition of Butyl Vinyl Ether then N-methylimidazole 0.8 L of the solution of 30% by weight of polyoctenamer in heptane (produced as per example 4A) was further diluted to 5% by weight with 4.2 L of heptane. The obtained 5 L of polymer solution was pumped recirculated 3 hours at 50° C. and then purified by diafiltration through a PuraMem® UF (cut-off about 35 000 Da) ultrafiltration polymer membrane from Evonik Resource Efficiency GmbH. This was carried out using a crossflow filtration system with an 1812 membrane module (membrane area about 0.14 m$^2$). The addition of fresh solvent was synchronized with the permeate flow so that the fill level in the feed container remained constant. The experiment was performed at 50° C. and 3 bar and altogether 15 L of fresh heptane were added (3 washing volumes in relation to the starting volume of the polymer solution). 5 L of polymer solution were obtained as retentate after this purification. 15 L of permeate solution were also obtained.

Heat Treatment at 180° C.
For analytical purposes 10 mL of the retentate (purified polymer solution) were dried in an aluminium dish in a vacuum drying cabinet over 20 h at 180° C. and a vacuum of 1 mbar after inertization with nitrogen. 2 g of white solid were obtained. The NMR spectrum of the solid corresponded to the expected structure of a polyoctenamer which contained 0.30 mol % of vinyl end groups and 0.26 mol % of cyclohexene end groups. Cis/trans double bond ratio: 22/78

$^1$H NMR (CDCl$_3$, 500 MHz, 30° C.) δ (ppm): Polyoctenamer: 5.38, 5.34, 2.01, 1.96, 1.30; end groups: 5.81 (m, 1H, —CH2=C$\underline{H}$—CH2-), 5.66 (d, 2H, CH2-C$\underline{H}$=C$\underline{H}$—CH2), 5.38-5.34 (m, 2H, —CH—C$\underline{H}$=C$\underline{H}$—CH2), 4.95 (m, 2H, C$\underline{H}$2=CH—CH2-).

Melting point: 57° C.
Melting enthalpy: 78 J/g
Molar mass $M_w$: 104 400 g/mol
Oligomer proportion (M<3000 g/mol): 0.7%

The high melting point (>56° C.) and the high melting enthalpy (>75 J/g) showed that the purified polyoctenamer was stable under the temperature conditions at 180° C.

The reduction in the oligomer proportion in the GPC compared to the starting solution (see example 3A) showed that this purification by ultrafiltration allowed separation of oligomers. A trace elemental analysis showed that the polymer contained only 0.3 ppm of ruthenium. In addition, no insoluble particles in the polymer solution were observed.

Example 5A (Comparative Example): Synthesis of Polyoctenamer in Toluene with Ru Catalyst and Addition of Butyl Vinyl Ether then Acetonitrile 800 mL of toluene, 300 g of cyclooctene (COE) and 1.03 g of vinyl cyclohexane (VCH) were charged into a dry 2 L glass reactor fitted with a mechanical stirrer under argon. The reaction mixture was heated to 50° C. and a solution of 24 mg of tricyclohexylphosphine[1,3-bis(2,4,6-trimethylphenyl)-4,5-dimethylimidazol-2-ylidene](2-thienylmethyliden)ruthenium(II) dichloride (catalyst C3) in 5.4 of toluene was added. A temperature increase of 19° C. was observed and the reaction mixture became markedly more viscous. 2.7 g of butyl vinyl ether were added 15 min after catalyst addition. The reaction mixture was stirred for a further 15 min and 0.11 g of acetonitrile was added. After 30 min at 50° C. the contents of the reactor were discharged and a solution of 30% by weight of polyoctenamer in toluene was obtained.

Heat Treatment at 80° C.
For analytical purposes 10 mL of this solution were dried in an aluminium dish in a vacuum drying cabinet over 3 h at 80° C. and a vacuum of 1 mbar after inertization with nitrogen. 2 g of white solid were obtained. The NMR spectrum of the solid corresponded to the expected structure of a polyoctenamer which contained 0.29 mol % of vinyl end groups and 0.36 mol % of cyclohexene end groups. Cis/trans double bond ratio: 21/79

$^1$H NMR (CDCl$_3$, 500 MHz, 30° C.) δ (ppm): Polyoctenamer: 5.38, 5.34, 2.01, 1.96, 1.30; end groups: 5.81 (m, 1H, —CH2=C$\underline{H}$—CH2-), 5.66 (d, 2H, CH2-C$\underline{H}$=C$\underline{H}$—CH2), 5.38-5.34 (m, 2H, —CH—C$\underline{H}$=C$\underline{H}$—CH2), 4.95 (m, 2H, C$\underline{H}$2=CH—CH2-).

Melting point: 57° C.
Melting enthalpy: 78 J/g
Molar mass $M_w$: 105 000 g/mol
Oligomer proportion (M<3000 g/mol): 3%
Heat Treatment at 180° C.

For analytical purposes 10 mL of this solution were dried in an aluminium dish in a vacuum drying cabinet over 20 h at 180° C. and a vacuum of 1 mbar after inertization with nitrogen. 2 g of white solid were obtained. The NMR spectrum of the solid partly corresponded to the expected structure of a polyoctenamer (see above) but the end groups (vinyl and cyclohexene end groups) were absent and unknown signals were observed in the olefin region. Cis/trans double bond ratio: 25/75

Melting point: 35° C.
Melting enthalpy: 63 J/g

The markedly lower melting point and melting enthalpy compared to drying at 80° C. showed that the polymer was unstable at a temperature of 180° C. A trace elemental analysis showed that the polymer contained 8.5 ppm of ruthenium.

Example 5B (Inventive): Membrane Purification of Polyoctenamer in Toluene with Ru Catalyst and Addition of Butyl Vinyl Ether then Acetonitrile 0.8 L of the solution of 30% by weight of polyoctenamer in toluene (produced as per example 5A) was further diluted to 5% by weight with 4.2 L of toluene. The obtained 5 L of polymer solution was recirculated for 3 hours at 50° C. and then purified by diafiltration through a PuraMem® UF (cut-off about 35 000 Da) ultrafiltration polymer membrane from Evonik Resource Efficiency GmbH. This was carried out using a crossflow filtration system with an 1812 membrane module (membrane area about 0.14 m$^2$). The addition of fresh solvent was synchronized with the permeate flow so that the fill level in the feed container remained constant. The experiment was performed at 50° C. and 3 bar and altogether 15 L of fresh toluene were added (3 washing volumes in relation to the starting volume of the polymer solution). 5 L of polymer solution were obtained as retentate after this purification. 15 L of permeate solution were also obtained.

Heat Treatment at 180° C.

For analytical purposes 10 mL of the retentate (purified polymer solution) were dried in an aluminium dish in a vacuum drying cabinet over 20 h at 180° C. and a vacuum of 1 mbar after inertization with nitrogen. 2 g of white solid were obtained. The NMR spectrum of the solid corresponded to the expected structure of a polyoctenamer which contained 0.26 mol % of vinyl end groups and 0.34 mol % of cyclohexene end groups, Cis/trans double bond ratio: 21/79

$^1$H NMR (CDCl$_3$, 500 MHz, 30° C.) δ (ppm); Polyoctenamer: 5.38, 5.34, 2.01, 1.96, 1.30; end groups; 5.81 (m, 1H, —CH2=CH—CH2-), 5.66 (d, 2H, CH2-CH=CH—CH2), 5.38-5.34 (m, 2H, —CH—CH=CH—CH2), 4.95 (m, 2H, CH2=CH—CH2-).

Melting point: 57° C.
Melting enthalpy: 78 J/g
Molar mass M$_w$: 111 000 g/mol
Oligomer proportion (M<3000 g/mol): 0.95%

The high melting point (>56° C.) and the high melting enthalpy (>75 J/g) showed that the purified polyoctenamer was stable under the temperature conditions at 180° C.

The reduction in the oligomer proportion in the GPC compared to the starting solution (see example 3A) showed that this purification by ultrafiltration allowed separation of oligomers. A trace elemental analysis showed that the polymer contained only 2.1 ppm of ruthenium. In addition, no insoluble particles in the polymer solution were observed.

Example 6A (Comparative Example): Synthesis of Polyoctenamer in Toluene with Ru Catalyst and Addition of Butyl Vinyl Ether then 2-aminophenol 800 mL of toluene, 300 g of cyclooctene (COE) and 1.03 g of vinyl cyclohexene (VCH) were charged into a dry 2 L glass reactor fitted with a mechanical stirrer under argon. The reaction mixture was heated to 50° C. and a solution of 24 mg of tricyclohexylphosphine[1,3-bis(2,4,6-trimethylphenyl)-4,5-dimethylimidazol-2-ylidene](2-thienylmethyliden)ruthenium(II) dichloride (catalyst C3) in 5.4 mL of toluene was added. A temperature increase of 22° C. was observed and the reaction mixture became markedly more viscous. 2.7 g of butyl vinyl ether were added 15 min after catalyst addition. The reaction mixture was stirred for a further 15 min and 0.3 g of 2-aminophenol (dissolved in 10 ml of ethanol) was added. After 30 min at 50° C. the contents of the reactor were discharged and a solution of 30% by weight of polyoctenamer in toluene was obtained.

Heat Treatment at 80° C.

For analytical purposes 10 mL of this solution were dried in an aluminium dish in a vacuum drying cabinet over 3 h at 80° C. and a vacuum of 1 mbar after inertization with nitrogen. 2 g of white solid were obtained. The NMR spectrum of the solid corresponded to the expected structure of a polyoctenamer which contained 0.26 mol % of vinyl end groups and 0.28 mol % of cyclohexene end groups. Cis/trans double bond ratio: 22/78

$^1$H NMR (CDCl$_3$, 500 MHz, 30° C.) δ (ppm): Polyoctenamer: 5.38, 5.34, 2.01, 1.96, 1.30; end groups: 5.81 (m, 1H, —CH2=CH—CH2-). 5.66 (d, 2H, CH2-CH=CH—CH2), 5.38-5.34 (m, 2H, —CH—CH=CH—CH2), 4.95 (m, 2H, CH2=CH—CH2-).

Melting point: 59° C.
Melting enthalpy: 80 J/g
Molar mass M$_w$: 103 600 g/mol
Oligomer proportion (M<3000 g/mol): 1.7%

Heat Treatment at 180° C.

For analytical purposes 10 mL of this solution were dried in an aluminium dish in a vacuum drying cabinet over 20 h at 180° C. and a vacuum of 1 mbar after inertization with nitrogen. 2 g of white solid were obtained. The NMR spectrum of the solid partly corresponded to the expected structure of a polyoctenamer (see above) but the end groups (vinyl and cyclohexene end groups) were absent and unknown signals were observed in the olefin region. Cis/trans double bond ratio: 25/75

Melting point: 30° C.
Melting enthalpy: 67 J/g

The markedly lower melting point and melting enthalpy compared to drying at 80° C. showed that the polymer was unstable at a temperature of 180° C. A trace elemental analysis showed that the polymer contained 8.5 ppm of ruthenium.

Example 6B (Inventive): Membrane Purification of Polyoctenamer in Toluene with Ru Catalyst and Addition of Butyl Vinyl Ether then N-methylimidazole 0.8 L of the solution of 30% by weight of polyoctenamer in toluene (produced as per example 6A) was further diluted to 5% by weight with 4.2 L of toluene. The obtained 5 L of polymer solution was recirculated for 3 hours at 50° C. and then purified by diafiltration through a PuraMem® UF (cut-off about 35 000 Da) ultrafiltration polymer membrane from Evonik Resource Efficiency GmbH. This was carried out using a crossflow filtration system with an 1812 membrane module (membrane area about 0.14 m$^2$). The addition of fresh solvent was synchronized with the permeate flow so that the fill level in the feed container remained constant. The experiment was performed at 50° C. and 3 bar and altogether 15 L of fresh toluene were added (3 washing volumes in relation to the starting volume of the polymer solution). 5 L of polymer solution were obtained as retentate after this purification. 15 L of permeate solution were also obtained.

Heat Treatment at 180° C.

For analytical purposes 10 mL of the retentate (purified polymer solution) were dried in an aluminium dish in a vacuum drying cabinet over 20 h at 180° C. and a vacuum of 1 mbar after inertization with nitrogen. 2 g of white solid were obtained. The NMR spectrum of the solid corresponded to the expected structure of a polyoctenamer which contained 0.25 mol % of vinyl end groups and 0.26 mol % of cyclohexene end groups. Cis/trans double bond ratio: 21/79

$^1$H NMR (CDCl$_3$, 500 MHz, 30° C.) δ (ppm): Polyoctenamer: 5.38, 5.34, 2.01, 1.96, 1.30; end groups: 5.81 (m, 1H, —CH2=C$\underline{H}$—CH2-). 5.66 (d, 2H, CH2-C$\underline{H}$=C$\underline{H}$—CH2), 5.38-5.34 (m, 2H, —CH—C$\underline{H}$=C$\underline{H}$—CH2), 4.95 (m, 2H, C$\underline{H}$2=CH—CH2-).

Melting point: 59° C.
Melting enthalpy: 81 J/g
Molar mass $M_w$: 109 000 g/mol
Oligomer proportion (M<3000 g/mol): 0.5%

The high melting point (>56° C.) and the high melting enthalpy (>75 J/g) showed that the purified polyoctenamer was stable under the temperature conditions at 180° C.

The reduction in the oligomer proportion in the GPC compared to the starting solution (see example 3A) showed that this purification by ultrafiltration allowed separation of oligomers. A trace elemental analysis showed that the polymer contained only 0.7 ppm of ruthenium. In addition, no insoluble particles in the polymer solution were observed.

Example 7A (Comparative Example): Synthesis of Polyoctenamer in Toluene with Ru Catalyst and Addition of Butyl Vinyl Ether then N-methylimidazole 800 mL of toluene, 300 g of cyclooctene (COE) and 1.03 g of vinyl cyclohexene (VCH) were charged into a dry 2 L glass reactor fitted with a mechanical stirrer under argon. The reaction mixture was heated to 50° C. and a solution of 24 mg of tricyclohexylphosphine[1,3-bis(2,4,6-trimethylphenyl)-4,5-dimethylimidazol-2-ylidene](2-thienylmethyliden)ruthenium(II) dichloride (catalyst C3) in 5.4 mL of toluene was added. A temperature increase of 20° C. was observed and the reaction mixture became markedly more viscous. 2.7 g of butyl vinyl ether were added 15 min after catalyst addition. The reaction mixture was stirred for a further 15 min and 0.22 g of N-methylimidazole was added. After 30 min at 50° C. the contents of the reactor were discharged and a solution of 30% by weight of polyoctenamer in toluene was obtained.

Heat Treatment at 80° C.

For analytical purposes 10 mL of this solution were dried in an aluminium dish in a vacuum drying cabinet over 3 h at 80° C. and a vacuum of 1 mbar after inertization with nitrogen. 2 g of white solid were obtained. The NMR spectrum of the solid corresponded to the expected structure of a polyoctenamer which contained 0.32 mol % of vinyl end groups and 0.32 mol % of cyclohexene end groups. Cis/trans double bond ratio: 21/79

$^1$H NMR (CDCl$_3$, 500 MHz, 30° C.) δ (ppm): Polyoctenamer: 5.38, 5.34, 2.01, 1.96, 1.30; end groups: 5.81 (m, 1H, —CH2=C$\underline{H}$—CH2-). 5.66 (d, 2H, CH2-C$\underline{H}$=C$\underline{H}$—CH2), 5.38-5.34 (m, 2H, —CH—C$\underline{H}$=C$\underline{H}$—CH2), 4.95 (m, 2H, C$\underline{H}$2=CH—CH2-).

Melting point: 59° C.
Melting enthalpy: 80 J/g
Molar mass $M_w$: 107 500 g/mol
Oligomer proportion (M<3000 g/mol): 2%
Heat Treatment at 180° C.

For analytical purposes 10 mL of this solution were dried in an aluminium dish in a vacuum drying cabinet over 20 h at 180° C. and a vacuum of 1 mbar after inertization with nitrogen. 2 g of white solid were obtained. The NMR spectrum of the solid partly corresponded to the expected structure of a polyoctenamer (see above) but the end groups (vinyl and cyclohexene end groups) were absent and unknown signals were observed in the olefin region. Cis/trans double bond ratio: 24/76

Melting point: 47° C.
Melting enthalpy: 66 J/g

The markedly lower melting point and melting enthalpy compared to drying at 80° C. showed that the polymer was unstable at a temperature of 180° C. A trace elemental analysis showed that the polymer contained 8.8 ppm of ruthenium.

Example 7B (Inventive): Membrane Purification of Polyoctenamer in Toluene with Ru Catalyst and Addition of Butyl Vinyl Ether then N-methylimidazole 0.8 L of the solution of 30% by weight of polyoctenamer in toluene (produced as per example 7A) was further diluted to 5% by weight with 4.2 L of toluene. The obtained 5 L of polymer solution was recirculated for 3 hours at 50° C. and then purified by diafiltration through a PuraMem® UF (cut-off about 35 000 Da) ultrafiltration polymer membrane from Evonik Resource Efficiency GmbH. This was carried out using a crossflow filtration system with an 1812 membrane module (membrane area about 0.14 m$^2$). The addition of fresh solvent was synchronized with the permeate flow so that the fill level in the feed container remained constant. The experiment was performed at 50° C. and 3 bar and altogether 15 L of fresh toluene were added (3 washing volumes in relation to the starting volume of the polymer solution). 5 L of polymer solution were obtained as retentate after this purification. 15 L of permeate solution were also obtained.

Heat treatment at 180° C.

For analytical purposes 10 mL of the retentate (purified polymer solution) were dried in an aluminium dish in a vacuum drying cabinet over 20 h at 180° C. and a vacuum of 1 mbar after inertization with nitrogen. 2 g of white solid were obtained. The NMR spectrum of the solid corresponded to the expected structure of a polyoctenamer which contained 0.30 mol % of vinyl end groups and 0.29 mol % of cyclohexene end groups. Cis/trans double bond ratio: 21/79

$^1$H NMR (CDCl$_3$, 500 MHz, 30° C.) δ (ppm): Polyoctenamer: 5.38, 5.34, 2.01, 1.96, 1.30; end groups: 5.81 (m, 1H, —CH2=C$\underline{H}$—CH2-), 5.66 (d, 2H, CH2-C$\underline{H}$=C$\underline{H}$—CH2), 5.38-5.34 (m, 2H, —CH—C$\underline{H}$=C$\underline{H}$—CH2), 4.95 (m, 2H, C$\underline{H}$2=CH—CH2-).

Melting point: 60° C.
Melting enthalpy: 81 J/g
Molar mass $M_w$: 113 000 g/mol
Oligomer proportion (M<3000 g/mol): 0.5%

The high melting point (>56° C.) and the high melting enthalpy (>75 J/g) showed that the purified polyoctenamer was stable under the temperature conditions at 180° C.

The reduction in the oligomer proportion in the GPC compared to the starting solution (see example 3A) showed that this purification by ultrafiltration allowed separation of oligomers. A trace elemental analysis showed that the polymer contained only 0.3 ppm of ruthenium. In addition, no insoluble particles in the polymer solution were observed.

Example 8A (Comparative Example): Synthesis of Polyoctenamer in Toluene with Ru Catalyst and Addition of Ethyl Vinyl Sulfide then N-methylimidazole 800 mL of toluene, 300 g of cyclooctene (COE) and 1.03 g of vinyl cyclohexene (VCH) were charged into a dry 2 L glass reactor fitted with a mechanical stirrer under argon. The reaction mixture was heated to 50° C. and a solution of 24 mg of tricyclohexylphosphine[1,3-bis(2,4,6-trimethylphenyl-4,5-dimethylimidazol-2-ylidene](2-thienylmethyliden)ruthenium(II) dichloride (catalyst C3) in 5.4 mL of toluene was added. A temperature increase of 21° C. was observed and the reaction mixture became markedly more viscous. 2.4 g of ethyl vinyl sulfide were added 15 min after catalyst addition. The reaction mixture was stirred for a further 15 min and 0.22 g of N-methylimidazole was added. After 30 min at 50° C. the contents of the reactor were discharged and a solution of 30% by weight of polyoctenamer in toluene was obtained.

Heat Treatment at 80° C.

For analytical purposes 10 mL of this solution were dried in an aluminium dish in a vacuum drying cabinet over 3 h at 80° C. and a vacuum of 1 mbar after inertization with nitrogen. 2 g of white solid were obtained. The NMR spectrum of the solid corresponded to the expected structure of a polyoctenamer which contained 0.33 mol % of vinyl end groups and 0.29 mol % of cyclohexene end groups. Cis/trans double bond ratio: 21/79

$^1$H NMR (CDCl$_3$, 500 MHz, 30° C.) δ (ppm): Polyoctenamer: 5.38, 5.34, 2.01, 1.96, 1.30; end groups: 5.81 (m, 1H, —CH2=CH—CH2-), 5.66 (d, 2H, CH2-CH=CH—CH2), 5.38-5.34 (m, 2H, —CH—CH=CH—CH2), 4.95 (m, 2H, CH2=CH—CH2-).

Melting point: 59° C.
Melting enthalpy: 81 J/g
Molar mass $M_w$: 114 700 g/mol
Oligomer proportion (M<3000 g/mol): 1.2%

Heat Treatment at 180° C.

For analytical purposes 10 mL of this solution were dried in an aluminium dish in a vacuum drying cabinet over 20 h at 180° C. and a vacuum of 1 mbar after inertization with nitrogen. 2 g of white solid were obtained. The NMR spectrum of the solid partly corresponded to the expected structure of a polyoctenamer (see above) but the end groups (vinyl and cyclohexene end groups) were absent and unknown signals were observed in the olefin region. Cis/trans double bond ratio: 22/78

Melting point: 50° C.
Melting enthalpy: 72 J/g

The markedly lower melting point and melting enthalpy compared to drying at 80° C. showed that the polymer was unstable at a temperature of 180° C. A trace elemental analysis showed that the polymer contained 8.6 ppm of ruthenium.

Example 8B (Inventive): Membrane Purification of Polyoctenamer in Toluene with Ru Catalyst and Addition of Ethyl Vinyl Sulfide then N-methylimidazole 0.8 L of the solution of 30% by weight of polyoctenamer in toluene (produced as per example 8A) was further diluted to 5% by weight with 4.2 L of toluene. The obtained 5 L of polymer solution was recirculated for 3 hours at 50° C. and then purified by diafiltration through a PuraMem® UF (cut-off about 35 000 Da) ultrafiltration polymer membrane from Evonik Resource Efficiency Gmbh. This was carried out using a crossflow filtration system with an 1812 membrane module (membrane area about 0.14 m$^2$). The addition of fresh solvent was synchronized with the permeate flow so that the fill level in the feed container remained constant. The experiment was performed at 50° C. and 3 bar and altogether 15 L of fresh toluene were added (3 washing volumes in relation to the starting volume of the polymer solution), 5 L of polymer solution were obtained as retentate after this purification. 15 L of permeate solution were also obtained.

Heat Treatment at 180° C.

For analytical purposes 10 mL of the retentate (purified polymer solution) were dried in an aluminium dish in a vacuum drying cabinet over 20 h at 180° C. and a vacuum of 1 mbar after inertization with nitrogen. 2 g of white solid were obtained. The NMR spectrum of the solid corresponded to the expected structure of a polyoctenamer which contained 0.32 mol % of vinyl end groups and 0.28 mol % of cyclohexene end groups. Cis/trans double bond ratio: 21/79

$^1$H NMR (CDCl$_3$, 500 MHz, 30° C.) δ (ppm): Polyoctenamer: 5.38, 5.34, 2.01, 1.96, 1.30; end groups: 5.81 (m, 1H, —CH2=CH—CH2-), 5.66 (d, 2H, CH2-CH=CH—CH2), 5.38-5.34 (m, 2H, —CH—CH=CH—CH2), 4.95 (m, 2H, CH2=CH—CH2-).

Melting point: 59° C.
Melting enthalpy: 81 J/g
Molar mass $M_w$: 113 800 g/mol
Oligomer proportion (M<3000 g/mol): 0.4%

The high melting point (>56° C.) and the high melting enthalpy (>75 J/g) showed that the purified polyoctenamer was stable under the temperature conditions at 180° C.

The reduction in the oligomer proportion in the GPC compared to the starting solution (see example 3A) showed that this purification by ultrafiltration allowed separation of oligomers. A trace elemental analysis showed that the polymer contained only 1.2 ppm of ruthenium. In addition, no insoluble particles in the polymer solution were observed.

Example 9A (Comparative Example): Synthesis of Polyoctenamer in Toluene with Ru Catalyst and Addition of Butyl Vinyl Ether then Pyridine 800 mL of toluene, 300 g of cyclooctene (COE) and 1.03 g of vinyl cyclohexene (VCH) were charged into a dry 2 L glass reactor fitted with a mechanical stirrer under argon. The reaction mixture was heated to 50° C. and a solution of 24 mg of tricyclohexylphosphine[1,3-bis(2,4,6-trimethylphenyl)-4,5-dimethylimidazol-2-ylidene](2-thienylmethyliden)ruthenium(II) dichloride (catalyst C3) in 5.4 mL of toluene was added. A temperature increase of 18° C. was observed and the reaction mixture became markedly more viscous. 2.7 g of butyl vinyl ether were added 15 min after catalyst addition. The reaction mixture was stirred for a further 15 min and 0.22 g of pyridine was added. After 30 min at 50° C. the contents of the reactor were discharged and a solution of 30% by weight of polyoctenamer in toluene was obtained.

Heat Treatment at 80° C.

For analytical purposes 10 mL of this solution were dried in an aluminium dish in a vacuum drying cabinet over 3 h at 80° C. and a vacuum of 1 mbar after inertization with nitrogen. 2 g of white solid were obtained. The NMR spectrum of the solid corresponded to the expected structure of a polyoctenamer which contained 0.28 mol % of vinyl end groups and 0.30 mol % of cyclohexene end groups. Cis/trans double bond ratio: 22/78

$^1$H NMR (CDCl$_3$, 500 MHz, 30° C.) δ (ppm): Polyoctenamer: end 5.38, 5.34, 2.01, 1.96, 1.30; end groups: 5.81 (m, 1H, —CH2=CH—CH2-), 5.66 (d, 2H, CH2-CH=CH—CH2), 5.38-5.34 (m, 2H, —CH—CH=CH—CH2), 4.95 (m. 2H, CH2=CH—CH2-).

Melting point: 57° C.
Melting enthalpy: 78 J/g
Molar mass M$_w$: 108 000 g/mol
Oligomer proportion (M<3000 g/mol): 1.7%
Heat Treatment at 180° C.

For analytical purposes 10 mL of this solution were dried in an aluminium dish in a vacuum drying cabinet over 20 h at 180° C. and a vacuum of 1 mbar after inertization with nitrogen. 2 g of white solid were obtained. The NMR spectrum of the solid partly corresponded to the expected structure of a polyoctenamer (see above) but the end groups (vinyl and cyclohexene end groups) were absent and unknown signals were observed in the olefin region. Cis/trans double bond ratio: 25/75

Melting point: 29° C.
Melting enthalpy: 59 J/g

The markedly lower melting point and melting enthalpy compared to drying at 80° C. showed that the polymer was unstable at a temperature of 180° C. A trace elemental analysis showed that the polymer contained 8.4 ppm of ruthenium.

Example 9B (Inventive): Membrane Purification of Polyoctenamer in Toluene with Ru Catalyst and Addition of Butyl Vinyl Ether then Pyridine 0.8 L of the solution of 30% by weight of polyoctenamer in toluene (produced as per example 9A) was further diluted to 5% by weight with 4.2 L of toluene. The obtained 5 L of polymer solution was recirculated for 3 hours at 50° C. and then purified by diafiltration through a PuraMem® UF (cut-off about 35 000 Da) ultrafiltration polymer membrane from Evonik Resource Efficiency GmbH. This was carried out using a crossflow filtration system with an 1812 membrane module (membrane area about 0.14 m$^2$). The addition of fresh solvent was synchronized with the permeate flow so that the fill level in the feed container remained constant. The experiment was performed at 50° C. and 3 bar and altogether 15 L of fresh toluene were added (3 washing volumes in relation to the starting volume of the polymer solution). 5 L of polymer solution were obtained as retentate after this purification. 15 L of permeate solution were also obtained.

Heat Treatment at 180° C.

For analytical purposes 10 mL of the retentate (purified polymer solution) were dried in an aluminium dish in a vacuum drying cabinet over 20 h at 180° C. and a vacuum of 1 mbar after inertization with nitrogen. 2 g of white solid were obtained. The NMR spectrum of the solid corresponded to the expected structure of a polyoctenamer which contained 0.26 mol % of vinyl end groups and 0.28 mol % of cyclohexene end groups, Cis/trans double bond ratio: 22/78

$^1$H NMR (CDCl$_3$, 500 MHz, 30° C.) δ (ppm); polyoctenamer: 5.38, 5.34, 2.01, 1.96, 1.30; end groups: 5.81 (m, 1H, —CH2=CH—CH2-), 5.66 (d, 2H, CH2-CH=CH—CH2), 5.38-5.34 (m, 2H, —CH—CH=CH—CH2), 4.95 (m, 2H, CH2=CH—CH2-).

Melting point: 57° C.
Melting enthalpy: 78 J/g
Molar mass M$_w$: 120 000 g/mol
Oligomer proportion (M<3000 g/mol): 0.5%

The high melting point (>56° C.) and the high melting enthalpy (>75 J/g) showed that the purified polyoctenamer was stable under the temperature conditions at 180° C.

The reduction in the oligomer proportion in the GPC compared to the starting solution (see example 3A) showed that this purification by ultrafiltration allowed separation of oligomers. A trace elemental analysis showed that the polymer contained only 1.0 ppm of ruthenium. In addition, no insoluble particles in the polymer solution were observed.

Example 10A: Synthesis of Polyoctenamer in Heptane with Tungsten/Aluminium Catalyst System and Addition of Butyl Vinyl Ether Followed by N-methylimidazole 585 mL of heptane, 100 g of cyclooctene (COE) and 0.34 g of vinyl cyclohexene (VCH) were charged into a dry 2 L glass reactor fitted with a mechanical stirrer under argon. The reaction mixture was heated to 50° C. and 0.4 mL of a solution of ethylaluminium dichloride (20% by weight) in heptane was added. Subsequently, 1 mL of a solution of tungsten hexachlorideipropylene oxide (1/3 mol/mol) in toluene (2.8% by weight of tungsten) were added slowly. 30 min after the catalyst addition 0.73 g of butyl vinyl ether were added and the mixture was stirred at 50° C. over 2 h. A temperature increase of 5° C. was observed and the reaction mixture became markedly more viscous. 0.91 g of butyl vinyl ether were added 15 min after catalyst addition. The reaction mixture was stirred for a further 15 min and 0.07 g of N-methylimidazole was added. After 30 min at 50° C. the contents of the reactor were discharged and a solution of 20% by weight of polyoctenamer in heptane was obtained.

Example 10B (Comparative Example): Membrane Purification of Polyoctenamer in Heptane with Tungsten/Aluminium Catalyst System and Addition of Butyl Vinyl Ether Followed by N-methylimidazole 1.25 L of the solution of 20% by weight of polyoctenamer in heptane (produced as per example 5A) was further diluted to 5% by weight with 3.75 L of heptane. The obtained 5 L of polymer solution was recirculated for 3 hours at 50° C. and then purified by diafiltration through a PuraMem® UF (cut-off about 35 000 Da) ultrafiltration polymer membrane from Evonik Resource Efficiency GmbH. This was carried out using a crossflow filtration system with an 1812 membrane module (membrane area about 0.14 m$^2$). The addition of fresh solvent was synchronized with the permeate flow so that the fill level in the feed container remained constant. The experiment was performed at 50° C. and 3 bar and altogether 25 L of fresh heptane were added (5 washing volumes in relation to the starting volume of the polymer solution). 5 L of polymer solution were obtained as retentate after this purification. 25 L of permeate solution were also obtained.

Heat Treatment at 180° C.

For analytical purposes 10 mL of the retentate (purified polymer solution) were dried in an aluminium dish in a vacuum drying cabinet over 20 h at 180° C. and a vacuum of 1 mbar after inertization with nitrogen. 1.5 g of white solid were obtained. The NMR spectrum of the solid corresponded to the expected structure of a polyoctenamer which contained 0.25 mol % of vinyl end groups and 0.30 mol % of cyclohexene end groups, Cis/trans double bond ratio: 22/78

$^1$H NMR (CDCl$_3$, 500 MHz, 30° C.) δ (ppm): Polyoctenamer: 5.38, 5.34, 2.01, 1.96, 1.30; end groups: 5.81 (m, 1H, —CH2=CH—CH2-), 5.66 (d, 2H, CH2-CH═CH—CH2), 5.38-5.34 (m, 2H, —CH—CH═CH—CH2), 4.95 (m, 2H, CH2=CH—CH2-).

Melting point: 54° C.
Melting enthalpy: 75 J/g
Molar mass M$_w$: 135 000 g/mol
Oligomer proportion (M<3000 g/mol): 3.8%

A trace elemental analysis showed that the polymer contained 250 ppm of tungsten, 125 ppm of aluminium and 110 ppm of chlorine.

In the ruthenium-catalyzed production of polyoctenamer a membrane filtration without alkyl vinyl ether resulted in a precipitation of grey particles and in a very low melting point of the polyoctenamer of 30° C. (example 2B). When alkyl vinyl ether or alkyl vinyl sulfide was added without performing a membrane filtration the polymers were not thermally stable at 180° C. (melting point in examples 3A, 4A, 5A, 6A, 7A, 8A, 9A between 29° C. and 50° C.) and the metal proportion in the polymer was much higher.

The combination of ruthenium catalyst, alkyl vinyl ether addition, compound A addition and membrane filtration resulted in a polyoctenamer which is thermally stable at

Summary

| Example | Catalyst | Solvent | Addition after reaction | Membrane filtration | Results after 180° C. heat treatment |
|---|---|---|---|---|---|
| 1A | EADC/WCl$_6$ | heptane | none | no | m.p. 54° C., 250 ppm W, 125 ppm Al, 110 ppm Cl |
| 1B | EADC/WCl$_6$ | heptane | none | 5 washing volumes | m.p. 54° C., 250 ppm W, 125 ppm Al, 110 ppm Cl |
| 2A | C3 | heptane | none | no | m.p. 30° C., 10 ppm Ru |
| 2B | C3 | heptane | none | 5 washing volumes | m.p. 30° C., precipitation of grey particles |
| 2C | C3 | heptane | butyl vinyl ether | 5 washing volumes | m.p. 49° C., 3.5 ppm Ru |
| 3A | C3 | heptane | butyl vinyl ether then 2-amino-phenol | no | m.p. 29° C., 8.6 ppm Ru |
| 3B* | C3 | heptane | butyl vinyl ether then 2-amino-phenol | 5 washing volumes | m.p. 59° C., 0.2 ppm Ru |
| 4A | C3 | heptane | butyl vinyl ether then N-methylimidazole | no | m.p. 49° C., 8.4 ppm Ru |
| 4B* | C3 | heptane | butyl vinyl ether then N-methylimidazole | 3 washing volumes | m.p. 57° C., 0.3 ppm Ru |
| 5A | C3 | toluene | butyl vinyl ether then acetonitrile | no | m.p. 35° C., 8.5 ppm Ru |
| 5B* | C3 | toluene | butyl vinyl ether then acetonitrile | 3 washing volumes | m.p. 57° C., 2.1 ppm Ru |
| 6A | C3 | toluene | butyl vinyl ether then 2-amino-phenol | no | m.p. 30° C., 8.5 ppm Ru |
| 6B* | C3 | toluene | butyl vinyl ether then 2-amino-phenol | 3 washing volumes | m.p. 59° C., 0.7 ppm Ru |
| 7A | C3 | toluene | butyl vinyl ether then N-methylimidazole | no | m.p. 47° C., 8.8 ppm Ru |
| 7B* | C3 | toluene | butyl vinyl ether then N-methylimidazole | 3 washing volumes | m.p. 60° C., 0.3 ppm Ru |
| 8A | C3 | toluene | ethyl vinyl sulfide then N-methylimidazole | no | m.p. 50° C., 8.6 ppm Ru |
| 8B* | C3 | toluene | ethyl vinyl sulfide then N-methylimidazole | 3 washing volumes | m.p. 59° C., 1.2 ppm Ru |
| 9A | C3 | toluene | butyl vinyl ether then pyridine | no | m.p. 29° C., 8.4 ppm Ru |
| 9B* | C3 | toluene | butyl vinyl ether then pyridine | 3 washing volumes | m.p. 57° C., 1.0 ppm Ru |
| 10B | EADC/WCl$_6$ | heptane | butyl vinyl ether then N-methylimidazole | 5 washing volumes | m.p. 54° C., 250 ppm W, 125 ppm Al, 110 ppm Cl |

*inventive
EADC = Ethylaluminium dichloride, m.p. = melting point

Polyoctenamer synthesized with tungsten catalyst and subsequently subjected to a membrane filtration showed a melting point below 57° C. High chlorine and metal proportions were also present (cf. example 1B). An addition of an alkyl vinyl ether and a compound A (example 10B) did not show any change in melting point and metal proportions.

180° C. and has a high melting point of 57° C. to 60° C. and a low residual metal proportion.

The invention claimed is:
1. A process for producing a polyalkenamer-containing composition, the process comprising:

a) reacting at least one cycloalkene by ring-opening metathesis polymerization in at least one organic solvent to obtain a polyalkenamer-containing product mixture,
   wherein the polymerization is performed in the presence of at least one metal-containing catalyst,
   wherein a metal of the at least one metal-containing catalyst is selected from the group consisting of rhenium, ruthenium, osmium and mixtures thereof,
   wherein the at least one cycloalkene is selected from the group consisting of cyclobutene, cyclopentene, cycloheptene, cyclooctene, cyclononene, cyclodecene, cyclododecene, cycloocta-1,5-diene, 1,5-dimethylcycloocta-1,5-diene, cyclodecadiene, norbornadiene, cyclododeca-1,5,9-triene, trimethylcyclododeca-1,5,9-triene, norbornene (bicy-clo[2.2.1]hept-2-ene), 5-(3'-cyclohexenyl)-2-norbornene, 5-ethyl-2-norbornene, 5-vinyl-2-norbornene, 5-ethylidene-2-norbornene, dicyclopentadiene and mixtures thereof,
b) adding at least one alkyl vinyl derivative selected from the group consisting of $C_1$- to $C_{12}$-alkyl vinyl ethers, $C_1$- to $C_{12}$-alkyl vinyl sulfides and mixtures thereof after the polymerization,
   wherein an amount of the at least one alkyl vinyl derivative is at least equal to an amount of the at least one metal-containing catalyst,
c) adding at least one compound A after addition of the at least one alkyl vinyl derivative, wherein an amount of the at least one compound A is at least equal to the amount of the at least one-metal containing catalyst,
   wherein the at least one compound A has at least one of the features i) or ii):
   i) at least one functional group selected from the group consisting of primary amino groups, secondary amino groups, tertiary amino groups, thiol groups, ester groups, carbonate ester groups, acetal groups, aldehyde groups, carbonyl groups, carboxamido groups, imido groups, oxime groups, thioester groups, nitrile groups, thiocyanate groups, primary ketimino groups, secondary ketimino groups, primary aldimino groups, secondary aldimino groups, sulfinyl groups, amino oxide groups, carboxyl groups, phosphino groups, phosphane oxide groups, and phosphono groups,
   ii) at least one saturated or unsaturated aliphatic or aromatic heterocyclic ring having 3 to 14 ring atoms,
   wherein ring atoms of the heterocyclic ring contain at least one carbon atom and at least one atom selected from the group consisting of oxygen, nitrogen and sulfur, and
d) working up the product mixture to remove the at least one metal-containing catalyst to obtain the polyalkenamer-containing composition, wherein the working up is carried out by membrane filtration in at least one organic solvent, wherein the polyalkenamer is dissolved during the membrane filtration.

2. The process according to claim 1, wherein ethyl vinyl ether, butyl vinyl ether or mixtures thereof are added as the at least one alkyl vinyl ether.

3. The process according to claim 1, wherein methyl vinyl sulfide, ethyl vinyl sulfide, propyl vinyl sulfide, butyl vinyl sulfide or mixtures thereof are added as the at least one alkyl vinyl sulfide.

4. The process according to claim 1, wherein the at least one compound A has the feature (i) and wherein the at least one functional group i) is selected from the group consisting of primary amino groups, secondary amino groups, carboxamido groups, nitrile groups, primary ketimino groups, secondary ketimino groups, primary aldimino groups, secondary aldimino groups, carbonyl groups, amino oxide groups, sulfinyl groups, phosphino groups and phosphane oxide groups.

5. The process according to claim 1, wherein the at least one compound A comprises at least one saturated or unsaturated aliphatic heterocyclic ring having 3 to 14 ring atoms or at least one aromatic heterocyclic ring having 5 to 14 ring atoms.

6. The process according to claim 1, wherein the at least one compound A comprises a nitrogen-containing aromatic ring.

7. The process according to claim 1, wherein a membrane of the membrane filtration has a separation-active layer selected from the group consisting of polymers, glass, metal, ceramic and mixtures thereof.

8. The process according to claim 1, wherein the at least one cycloalkene is selected from the group consisting of cyclopentene, cycloheptene, cyclooctene, cyclododecene and mixtures thereof.

9. The process according to claim 1, wherein the polymerization is performed in a nonpolar aromatic or aliphatic solvent.

10. The process according to claim 1, wherein the polymerization and the membrane filtration are performed in a solvent and the same solvent is used for the polymerization and the membrane filtration.

11. The process according to claim 1, wherein the metal of the at least one metal-containing catalyst is ruthenium.

12. The process according to claim 1, wherein the reaction of the at least one cycloalkene is carried out in the presence of a chain transfer agent.

13. The process according to claim 1, wherein the reaction of the at least one cycloalkene is carried out in the presence of an acyclic alkene as chain transfer agent having one or more non-conjugated double bonds, or a cyclic compound having a double bond in a side chain.

\* \* \* \* \*